United States Patent
Tournois et al.

(10) Patent No.: US 12,467,702 B2
(45) Date of Patent: Nov. 11, 2025

(54) FIXING DEVICE FOR HEAT EXCHANGERS OF A VEHICLE HEAT EXCHANGE SYSTEM

(71) Applicant: Valeo Systemes Thermiques, Le Mesnil Saint-Denis (FR)

(72) Inventors: Rémi Tournois, Le Mesnil Saint-Denis (FR); José Trindade, Le Mesnil Saint-Denis (FR); Fabien Bireaud, Le Mesnil Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 344 days.

(21) Appl. No.: 17/602,413

(22) PCT Filed: Apr. 8, 2020

(86) PCT No.: PCT/EP2020/060107
§ 371 (c)(1),
(2) Date: Oct. 8, 2021

(87) PCT Pub. No.: WO2020/208119
PCT Pub. Date: Oct. 15, 2020

(65) Prior Publication Data
US 2022/0205741 A1  Jun. 30, 2022

(30) Foreign Application Priority Data
Apr. 11, 2019 (FR) .................................. FR1903897

(51) Int. Cl.
*F28F 9/013* (2006.01)
*F28D 7/16* (2006.01)

(52) U.S. Cl.
CPC ................ *F28F 9/013* (2013.01); *F28D 7/16* (2013.01)

(58) Field of Classification Search
CPC ................................... F28F 9/013; F28D 7/16
(Continued)

(56) References Cited

U.S. PATENT DOCUMENTS

| 1,804,936 A | * | 5/1931 | Jacocks ..................... F28D 7/16 165/66 |
| 5,535,819 A | * | 7/1996 | Matsuura .............. F28F 9/0243 165/149 |

(Continued)

FOREIGN PATENT DOCUMENTS

| DE | 19814028 A1 | 10/1998 |
| EP | 0869325 A2 | 10/1998 |

(Continued)

OTHER PUBLICATIONS

International Search Report and Written Opinion in corresponding International Application No. PCT/EP2020/060107, mailed Jun. 30, 2020 (11 pages).

(Continued)

*Primary Examiner* — Gordon A Jones
(74) *Attorney, Agent, or Firm* — Osha Bergman Watanabe & Burton LLP

(57) ABSTRACT

Disclosed is a fixing device (4) for at least two heat exchangers (3) stacked in relation to each other and integrated in a heat exchange system (1) of a vehicle, characterised in that the fixing device (4) is a one-piece assembly comprising components (5) for retaining heat exchangers (3), on the one hand, and a flange (7) for fixing to a support frame (2) of the heat exchange system (1), on the other hand, said retention components (5) being arranged so as to project from a single base plate. The invention also claims a heat exchange system (1) comprising at least two heat exchangers (3) and a fixing device (4) according to the invention.

8 Claims, 3 Drawing Sheets

(58) Field of Classification Search
USPC ......................................................... 165/175
See application file for complete search history.

(56) References Cited

U.S. PATENT DOCUMENTS

| | | | | |
|---|---|---|---|---|
| 6,470,961 B1 * | 10/2002 | Case | ....................... | F28F 9/002 |
| | | | | 165/149 |
| 6,901,992 B2 * | 6/2005 | Kent | ..................... | F28F 21/067 |
| | | | | 180/68.4 |
| 7,040,380 B1 * | 5/2006 | O'Brien | ................... | F28F 9/002 |
| | | | | 165/149 |
| 7,117,927 B2 * | 10/2006 | Kent | ....................... | F28F 9/002 |
| | | | | 24/458 |
| 7,284,594 B2 * | 10/2007 | Sanada | .................. | F28F 9/002 |
| | | | | 165/41 |
| 8,522,860 B2 * | 9/2013 | Kersting | ............ | B60H 1/00521 |
| | | | | 165/76 |
| 9,146,061 B2 * | 9/2015 | Farlow | .................... | F28F 9/002 |
| 10,274,267 B1 * | 4/2019 | Wilkinson | ............... | F28F 9/002 |
| 2002/0056541 A1 * | 5/2002 | Kokubunji | ............ | F28D 1/0435 |
| | | | | 165/149 |
| 2016/0216036 A1 * | 7/2016 | Armsden | .............. | F28D 1/0461 |
| 2018/0010865 A1 * | 1/2018 | Shin | ........................ | F28F 9/013 |
| 2018/0261526 A1 | 9/2018 | Machler et al. | | |

FOREIGN PATENT DOCUMENTS

| | | |
|---|---|---|
| EP | 1146311 A1 | 10/2001 |
| EP | 2265457 A2 | 12/2010 |

OTHER PUBLICATIONS

Preliminary Search Report and Written Opinion in corresponding French Application No. FR1903897, dated Dec. 3, 2019 (6 pages).

* cited by examiner

[Fig.1]
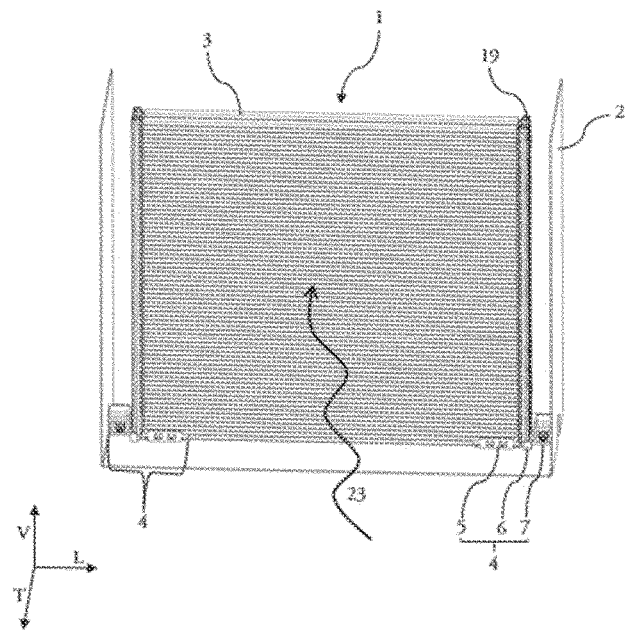
[Fig.2]
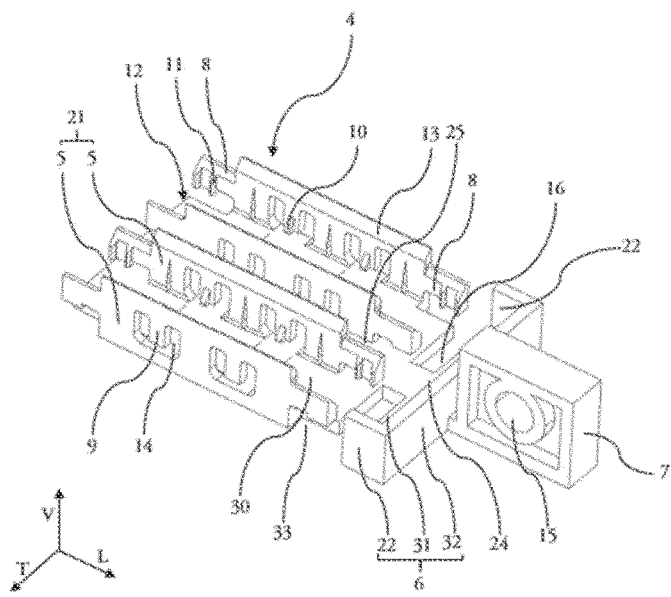

[Fig. 3]
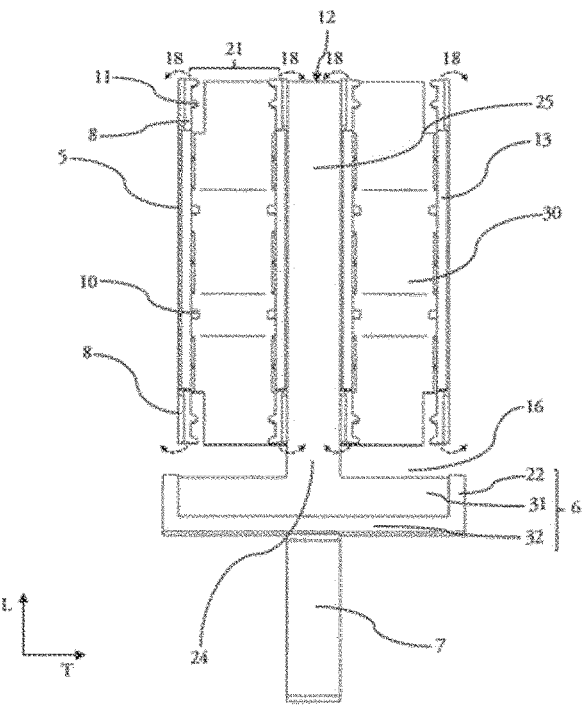
[Fig.4]
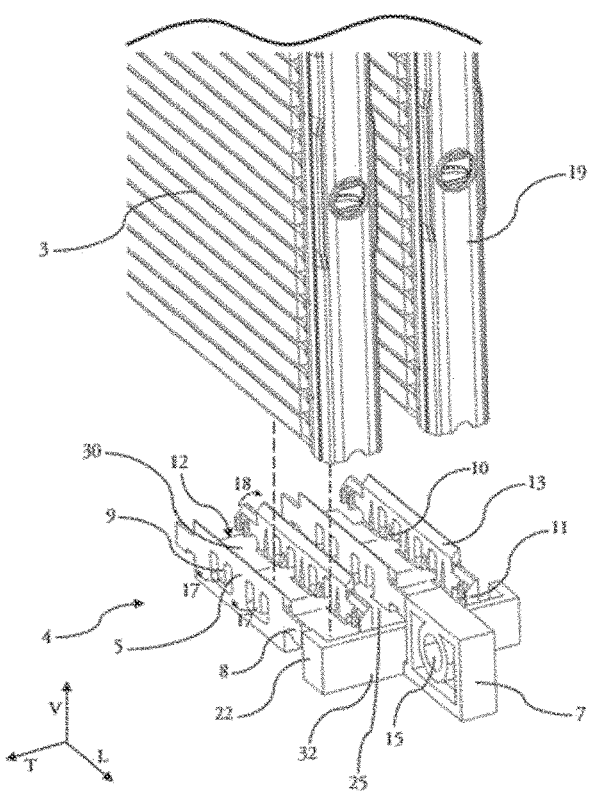

[Fig.5]
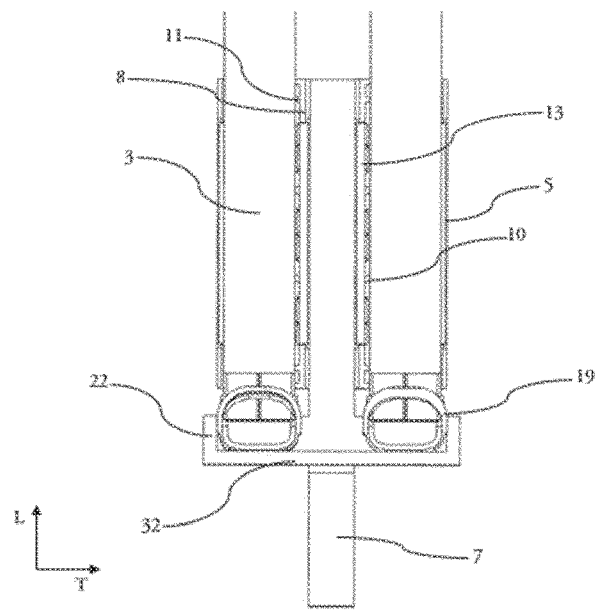
[Fig.6]
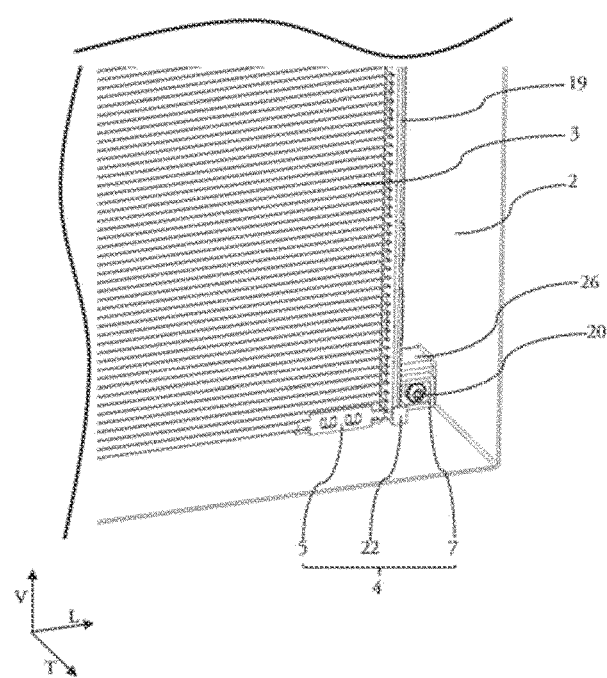

FIXING DEVICE FOR HEAT EXCHANGERS OF A VEHICLE HEAT EXCHANGE SYSTEM

The present invention relates to a device for fixing heat exchangers of a vehicle heat exchange system.

The present invention relates more particularly to the field of heat exchange systems having a distribution circuit for heat-transfer fluid, in which a plurality of heat exchangers are disposed, each being able to exchange heat energy between an air flow passing through the heat exchange system and the heat-transfer fluid circulating in this heat exchanger.

Within this type of heat exchange system, it is known to stack the heat exchangers one after another facing an opening in a radiator grille situated at the front face of a vehicle, such that when a flow of fresh air is drawn in when the vehicle is in motion, this air flow successively arrives at each of the heat exchangers. Such heat exchangers can have various functions such as the function of a condenser, a radiator or a supercooler for example.

In order to position the heat exchangers appropriately at the front face of the vehicle, a known arrangement consists in fixing these heat exchangers to a support frame that supports the whole of the heat exchange system in order to prevent the latter from making any superfluous movements caused for example by vibrations brought about by the motion of the vehicle.

Such arrangements are configured so as to fix each heat exchanger, independently of one another, to the support frame of the heat exchange system. This entails a multiplication of the fixing means and it will be understood that this has a negative effect on the mechanical bulk of the heat exchange system, and on the cost and time for assembling the system, or on the geometric precision of the assembly.

The present invention aims to address the problems set out above by proposing a device for fixing at least two heat exchangers that are stacked with respect to one another and are integrated in a heat exchange system of a vehicle, characterized in that the fixing device is a one-piece assembly comprising members for holding the heat exchangers, for the one part, and a flange for fixing to a support frame of the heat exchange system, for the other part, said holding members being arranged so as to protrude from one and the same base plate.

In other words, the fixing device is an intermediate part between the heat exchangers and the support frame of the heat exchange system. Advantageously, there is a single fixing device, which fixes the position of each heat exchanger in the frame while keeping the heat exchangers together and maintaining the connection to the support frame of the heat exchange system. The fixing device thus makes it possible to ensure that the heat exchange system operates properly, while limiting the fixing means and also the raw materials, costs and mechanical bulk that can be brought about thereby. It will be understood that the fixing device makes it possible to fix the position of each heat exchanger with respect to the support frame of the heat exchange system and also allows the position of the heat exchangers with respect to one another also to be fixed.

The fixing device is divided into several sections: a section intended to hold the heat exchanger via holding members, the characteristics of which will be set out below, and a section for fixing to the support frame of the heat exchange system via a flange, which will also be described in more detail below.

According to one feature of the invention, the holding members are walls perpendicular to the base plate and are disposed in pairs, each of the pairs being configured to grip the lower end of a heat exchanger and transversely hold said heat exchanger. The holding members extend vertically and longitudinally, in the form of walls that are longer than they are high and protrude from the base plate. The terms longitudinal and vertical mean along two axes parallel to the straight lines defining the plane of extension of the heat exchangers, the longitudinal straight line being parallel to the base plate, and the vertical line being perpendicular to the base plate.

The holding members interact with the lower end of the heat exchangers over a longitudinal and vertical distance. This interaction is sufficient to ensure the mechanical hold. The specifics of the elements that ensure the holding function will be described in more detail below.

Advantageously, the vertical extension of the holding members limits the mechanical bulk with regard to further connections that may be present in the region of the heat exchangers, such as pipes connected to the fluid distribution circuit, for example. The fact that the holding members are arranged along a lower longitudinal edge of the heat exchangers means that the mechanical bulk is limited on the sides of the heat exchange system and that the connection of the pipes is thus not impaired.

The question of limiting the mechanical bulk arises even more so when the heat exchangers have a smaller surface area, for example if the heat exchanger is a supercooler. In this situation, the space available at the lateral surface of the supercooler is limited. It is therefore important to limit the vertical extension of the holding members, as proposed by the fixing device according to the invention.

The holding members are situated on either side of the heat exchanger that they hold. The distance between two holding members forming a pair of holding members is therefore substantially equal to the thickness of one heat exchanger. The heat exchangers are gripped, pincer-style, by the holding members and are therefore prevented from moving transversely. The holding members comprise elements that will be described below, but the simple presence of a pair of holding members on either side of the heat exchanger ensures, by itself, that the latter is held.

According to one feature of the invention, the pairs of holding members are spaced apart from one another by a stiffening zone. The base plate of the fixing device is common to each of the holding members. The latter are all mutually parallel and, as mentioned above, are disposed in pairs for each heat exchanger. Since the holding members are all on the same base plate, the fixing device therefore holds the heat exchangers together. Furthermore, the parallelism of the pairs of holding members also ensures that the heat exchangers are stacked with respect to one another. Each pair of holding members is situated at a certain distance from one another. This spacing between the pairs of holding members is ensured by the presence of the base plate common to the holding members, which extends between the pairs of holding members, forming a zone referred to as the stiffening zone. The stiffening zone formed by the base plate fixes the heat exchangers at an optimal distance from one another for the heat exchanger system to operate properly.

According to one feature of the invention, the fixing device may comprise two pairs of holding members that are separated by a stiffening zone, the fixing flange being arranged in a centered position in the continuation of the stiffening zone. This is an embodiment comprising only two pairs of holding members, as illustrated below. Therefore, the fixing device in this case comprises only one stiffening zone separating the two pairs of holding members. Such a stiffening zone is consequently centered with respect to the transverse dimension of the base plate. The fixing flange is likewise centered with respect to the transverse dimension of the base plate, in the continuation of the stiffening zone.

According to one feature of the invention, the holding members comprise at least one flexible tongue that is able to retract by rotation about a longitudinal axis, opening up a receiving zone for the fitting of a heat exchanger, and is able to vertically hold the latter by elastic return across the receiving zone. The receiving zone is understood to be the zone delimited by a pair of holding members and by the base plate situated between the two holding members forming said pair. The flexible tongue is present on a longitudinal wall of each holding member. More specifically, the flexible tongue, when it is in its initial position, coincides with the holding member that comprises it, apart from a ramp present on the flexible tongue. The flexible tongue is surrounded by a recess within the holding member, this allowing it to be flexible.

The ramp is situated on one of the faces of the flexible tongue, which is oriented in the direction of the other holding member forming the pair of holding members. The ramp extends along a transverse axis, that is to say along an axis perpendicular to the holding members. The ramp has an oblique surface and a transverse flat surface, the two surfaces allowing the heat exchangers to be inserted and vertically held, respectively. The retraction of the flexible tongue takes place following direct contact between the heat exchanger and the oblique surface of the ramp. The flexible tongue retracts by rotation about a longitudinal axis, at the junction between the wall of the holding member and the flexible tongue, and then it returns to its initial position by means of an elastic return mechanism, The return mechanism allows the transverse flat surface of the ramp to bear against a portion of the heat exchanger once the latter is accommodated in the receiving zone and prevents the latter from moving vertically.

According to one feature of the invention, longitudinal end portions of the holding members are configured to be disconnected from the base plate and comprise claws that hook on the heat exchangers. In other words, longitudinal end portions of the holding members have the particular feature of not being directly in contact with the base plate. They thus exhibit a certain flexibility. Each longitudinal end of each holding member has claws. Just like the ramp of the flexible tongue, the claws are oriented in the direction of the receiving zone. The longitudinal end portions of the holding members exhibit freedom of movement and bend by rotation about a vertical axis, and then return to their initial position by elastic return. The claws thus hook on the lower part of the heat exchanger and therefore provide an additional hold for the heat exchanger on the fixing device. The hooking of the heat exchanger by the claws ensures that the latter is held in the longitudinal, transverse and vertical directions.

An upper part of the holding members is beveled so as to form an access ramp in the direction of the receiving zone for the heat exchanger. The upper part is understood to be the free end edge of the holding member, on the opposite side from the base plate. In order to make it easier to insert the heat exchangers between the holding members, the upper part of the latter is not flat, but oblique in the direction of the receiving zone for the heat exchangers. This oblique shape makes it easier to insert the heat exchanger which is directed toward its receiving zone by sliding over the oblique shapes if the heat exchanger is initially positioned poorly.

According to one feature of the invention, the fixing device comprises an intermediate part for positioning by abutment between the holding members for the heat exchangers and the flange for fixing to a support frame of the heat exchange system. The intermediate part for positioning by abutment is disposed at a distance from the holding members. It comprises a bottom wall which extends in the same plane as the base plate, a longitudinal abutment wall, and two transverse abutment walls. When the heat exchangers are fitted, their lateral walls are disposed against the intermediate part for positioning by abutment. More specifically, it is collector chambers, situated at the level of the lateral walls of the heat exchangers, that interact with the abutment walls of the intermediate part for positioning by abutment. These collector chambers comprise a portion of the fluid distribution circuit and have a thickness greater than the thickness of the heat exchangers.

The ends of the longitudinal abutment wall are bent at right angles in a direction parallel to a longitudinal axis, toward the holding members, forming transverse abutment walls. When the heat exchangers are inserted in the fixing device, the collector chambers of the heat exchangers, which are therefore not gripped by the holding members, bear against the longitudinal abutment wall, but also against the transverse abutment walls. The latter ensure that the heat exchangers are kept at a maximum distance from one another, thereby optimizing the efficiency of the heat exchange system.

According to one feature of the invention, the base plate comprises a material cutout between the holding members and the intermediate part for positioning by abutment. This material cutout is made from the longitudinal end portions of the holding members as far as the bottom wall of the intermediate part for positioning by abutment. In order that the fixing device stays in one piece, only a central strip of the base plate remains to preserve a connection between the part comprising the holding members and the bottom wall of the intermediate part for positioning by abutment. The purpose of the material cutout is to allow slight mechanical flexibility between the various parts of the fixing device, in spite of the stiffness of the base plate. This mechanical flexibility makes it possible to relax the dimensional requirements of the heat exchangers. Without this material cutout, the fixing device would have been stiffer, and this may cause mechanical breaks for example if heat exchangers having dimensions slightly different than the dimensions of the space provided to receive them are inserted, or during the mounting of the fixing device on the support frame.

As regards the fixing flange, this is provided with a connecting means that is able to cooperate with the support frame of the heat exchange system. The heat exchangers are mounted on the support frame, which holds the heat exchange system within the radiator grille situated at the front face of the vehicle. The support frame and the fixing device are fixed together via the fixing flange. The type of connecting means of the connecting flange and of the support frame are not specific, as long as they are able to cooperate with one another. The connecting flange and the part of the support frame interacting with the connecting flange may, for example, be provided with a hole for the insertion of a fixing means such as a screw, which secures the whole. The connection may also be made via a tongue system or clip system.

As mentioned above, the fixing flange is situated at an equal distance from the transverse ends of the base plate. The fact that the fixing flange is centered with respect to the base plate makes it possible to evenly distribute the mechanical stresses that act on the fixing device and also to limit the risks of a mechanical break.

The invention also claims a heat exchange system comprising at least two heat exchangers and a fixing device as described above, wherein the fixing device is arranged next to a vertical end edge of the heat exchangers, and a support frame to which the fixing device is fixed. It should be noted that the vertical orientation is defined depending on a position of the heat exchange system in line with the position it takes up once fitted in the vehicle. The fixing device is, for example, arranged on the lower part of the heat exchangers. The fixing device is fixed to the support frame by way of the fixing flange.

According to one feature of the invention, the heat exchangers are held mechanically by a second fixing device situated at the opposite longitudinal end from the longitudinal end comprising the first fixing device. The heat exchangers are therefore held on either side by a fixing device. The second fixing device is identical to the first. They therefore ensure the same functions, which are to fix each heat exchanger, hold the heat exchangers with respect to one another, and fix them to the support frame. The association of two fixing devices at each longitudinal end of the heat exchangers ensures an optimal hold.

Further features, details and advantages of the invention will become more clearly apparent from reading the following detailed description, and from studying several exemplary embodiments that are given purely by way of nonlimiting indication, with reference to the attached schematic drawings, in which:

FIG. 1 is an overall view of a heat exchange system connected to a support frame and comprising a fixing device according to the invention, FIG. 2 shows the fixing device, FIG. 3 is a top view of the fixing device, FIG. 4 illustrates the insertion of the heat exchangers into the fixing device, FIG. 5 is a cross-sectional view of the cooperation between heat exchangers and the fixing device, FIG. 6 is a depiction of the connection between the fixing flange of the fixing device and the support frame.

For the sake of clarity of the detailed description of the fixing device, the trihedron LVT will represent the orientation of the various elements of the detailed description. The longitudinal direction L and vertical direction V correspond to axes parallel to two intersecting straight lines defining the plane of extension of a heat exchanger, and the transverse direction T corresponds to an axis perpendicular to either one of the directions L and V, and corresponds to the main direction of the path of the air flow made to pass through the heat exchange system.

FIG. 1 is an overall depiction of a heat exchange system 1. The heat exchange system 1 comprises a plurality of stacked heat exchangers 3, in this case two heat exchangers. The heat exchange system 1 is generally disposed at the level of the radiator grille situated at the front face of a vehicle, such that the heat exchangers 3 are passed through by an air flow 23, transverse to the heat exchangers 3, which exchanges heat energy with a heat-transfer fluid made to circulate in the distribution circuit of the heat exchangers 3.

Each heat exchanger 3 has a bundle of tubes or plates, inside which the heat-transfer fluid circulates and which forms the heat exchange surface between the fluid and the air flow, and collector chambers 19 which laterally border the heat exchange surface.

The heat exchangers 3 comprise fins disposed in the zone between the tubes or the plates through which the air flow 23 passes, the fins consisting of corrugated sheet metal in thermal contact with the tubes or plates and having the function of increasing the surface area for exchange with the air flow 23 passing through the heat exchanger.

In order for the heat exchange system 1 to be fitted and held in the front face of the vehicle next to the radiator grille, and in order for the heat exchangers to be stacked with respect to one another while maintaining a theoretical spacing calculated in order to achieve optimal heat exchange in each heat exchanger, each heat exchanger is fixed to a support frame 2. In FIG. 1, the support frame 2 surrounds the heat exchange system 1 on three sides of this heat exchange system, but it is possible for it to extend all around the perimeter of the heat exchangers.

The connection between the heat exchange system 1, and the heat exchangers that make it up, and the support frame 2 is created via at least one fixing device 4 according to the invention. The fixing device 4, in addition to establishing a connection between the heat exchange system 1 and the support frame 2, keeps each heat exchanger 3 in place and prevents any longitudinal, vertical and transverse movement as per the trihedron LVT, as will be set out below.

Each holding device 4 comprises at least holding members 5, only one of which is visible in FIG. 1, for each holding device, an intermediate part 6 for positioning by abutment and a fixing flange 7.

The holding members 5 are configured to be operational on a vertical end edge of the heat exchange system, and more particularly in contact with a lower longitudinal wall of the heat exchangers 3. As illustrated, by comparison with the corresponding dimensions of the heat exchangers 3, the holding members 5 extend along a shorter vertical dimension and along a shorter longitudinal dimension, with the longitudinal dimension of the holding members 5 being greater than the vertical dimension of these holding members.

The intermediate part 6 for positioning by abutment longitudinally extends the holding members 5 and is configured and dimensioned so as to be able to accommodate the collector chambers 19 of the heat exchangers 3. This intermediate part has at least one abutment wall counter to the movement of the heat exchanger in the longitudinal direction, away from the other heat exchanger.

The fixing flange 7 is secured to the intermediate part 6 and consists of the part of the fixing device 4 that is connected to the support frame 2 and configured, where appropriate, to cooperate with a fixing means that is able to secure the fixing flange, and therefore any heat exchanger, to the frame.

Further details of each of the elements making up the fixing device 4 will be described below.

In the example illustrated in FIG. 1, two fixing devices 4 are situated on either side of the heat exchangers 3, or more particularly at each longitudinal end of the heat exchange system. This double fixing reinforces the hold of each of the heat exchangers 3 with respect to the front face of the vehicle, in particular by ensuring that each of the heat exchangers 3 is fixed to the support frame 2.

FIG. 2 shows the fixing device 4 according to the invention on its own, without an associated heat exchanger and fixing frame, so that the fixing device can be described in more detail.

The fixing device 4 comprises a plurality of holding members 5, in this case a pair, that respectively protrude from a common base plate 12. The intermediate part 6 for positioning by abutment is disposed in the continuation of the base plate common to the holding members, and the fixing flange 7 is secured to the base plate 12 via a wall of the intermediate part 6 for positioning by abutment from which it protrudes. The fixing device 4 is therefore entirely in one piece in that the elements that make it up, including the holding members 5 and the base plate 12, are inseparable from one another without breaking the fixing device, The holding members 5 are in the form of walls protruding from a first face of the base plate 12 and extending perpendicularly to the base plate 12. A free vertical end of each holding member 5, on the opposite side from the base plate, is defined by an upper part 13.

The holding members 5 are equipped with at least one flexible tongue 9, In the embodiment presented, each holding member 5 comprises two flexible tongues 9.

The holding members 5 are arranged on the common base plate so as to all be parallel to one another, all being identical to one another. Only their orientation varies, such that the holding members are grouped together in pairs 21 in which two holding members 5 face one another with their flexible tongues 9 next to one another. As a result, each pair 21 is able to hold a heat exchanger. Two holding members 5 forming a pair 21 are spaced apart by a distance that makes it possible to receive the heat exchangers, thereby defining a receiving zone 30 delimited by this pair of holding members and by the base plate situated between the two holding members forming this pair.

Each flexible tongue 9 is arranged in the plane of extension formed by the holding member 5 that comprises it, apart from a ramp 10 protruding from the base of the flexible tongue 9, and oriented in the direction of the other holding member 5 forming the pair 21. This geometry of the flexible tongue 9 is effective only when the latter is at rest, i.e. when it is not retracted. The flexible tongue 9 extends mainly along a vertical axis V and the holding member that carries it is configured such that said tongue is flexible between the rest position and a retracted position by pivoting about a longitudinal axis. Each flexible tongue is surrounded by a U-shaped recess 14, the flexible tongue 9 being retained only by the upper part 13 of the holding member 5 and therefore not being in contact with the base plate 12. It is this recess 14 that ensures the flexibility of the flexible tongue 9.

The ramp 10 is disposed on one of the faces of each flexible tongue 9. The ramp 10 extends toward the other holding member 5 forming the pair 21 and is therefore not part, as explained in detail above, of the plane of extension formed by the holding member 5, unlike the base of the flexible tongue 9. As illustrated, the ramp 10 has a transverse flat wall facing the base plate 12 in order to form a stop with respect to the disengagement of the heat exchanger when the latter is accommodated in the receiving zone 30, as will be described below, and an oblique wall, oriented away from the transverse flat wall, making it easier to retract the flexible tongue under the effect of the contact with the heat exchanger during the insertion of the latter between the pair of holding members.

Each holding member 5 extends mainly longitudinally. More particularly, a central portion in which the flexible tongues 9 are disposed is extended longitudinally on either side by a longitudinal end portion 8. The longitudinal end portions 8 have a vertical dimension less than the vertical dimension of a central portion of the holding members 5. Thus, unlike the central portion of the holding members 5, the longitudinal end portions 8 are not in contact with the base plate 12. Furthermore, a material clearance 33 is made in the base plate 12, in line with the longitudinal end portions 8. The material clearance 33 extends as far as the junction between these longitudinal end portions and the central portion of the holding members 5. just like the flexible tongues 9, the longitudinal end portions 8 therefore exhibit a certain flexibility ensuring a transverse clearance, this time about a vertical axis V formed by the junction between a central portion of the holding members 5 and the longitudinal end portion 8 in question.

The longitudinal end portions 8 each comprise claws 11 protruding transversely, in the same direction as the ramp 10 of the flexible tongues 9, that is to say toward the other holding member 5 forming a pair 21. The claws 11 extend transversely and have, at the opposite end from the longitudinal end portion, a sharp point that is able to be anchored in the fins formed between the tubes or plates of the heat exchangers. The claws 11 also comprise, just like the ramp 10, an oblique upper wall that makes it easier to retract the claws and the associated longitudinal end portion in order to allow the insertion of the heat exchanger into the receiving zone. By elastic return, the claws 11 help to fix the heat exchangers, as will be described below.

As was mentioned above, each holding member 5 is identical. The holding members 5 are disposed in pairs 21 and each of the holding members 5 contained in a pair 21 has a different orientation from one another. The holding members 5 are disposed in an orientation such that the ramps 10 and the claws 11 are oriented in the direction of the receiving zone 30 for the heat exchangers. The ramps 10 and the claws 11 are therefore intended to interact with the heat exchangers.

The upper part 13 of each holding member 5 is beveled. The bevel forms an inclined plane oriented in the direction of the receiving zone 30 for the heat exchangers in order to make it easier to insert a heat exchanger between the holding members 5 of a pair 21. The beveling of the upper parts 13 is also present in the longitudinal end portions 8 of the holding members 5.

In the embodiment proposed here, the fixing device 4 has the purpose of holding two heat exchangers, this therefore requiring four holding members 5 organized in two pairs 21.

The fixing device 4 comprises a stiffening zone 25 between each pair 21 of holding members 5. This stiffening zone is formed by a portion of the base plate 12 extending between the pairs of holding members. Unlike the portions of the base plate 12 that help to delimit a receiving zone with the holding members, which realize the stability of a pair of holding members and which form a stop to the insertion of the heat exchanger into this receiving zone, the portion of the base plate that forms the stiffening zone 25 is not in contact with the heat exchangers and has the function of stiffening the zone between two pairs of holding members in particular such that one of the pairs does not move away from the other under the effect of loads exerted on the heat exchanger that it carries.

In the embodiment illustrated, the fixing device 4 is able to receive two heat exchangers such that there is only one stiffening zone 25 between the two receiving zones 30 of the fixing device 4.

The intermediate part 6 for positioning by abutment extends in the longitudinal continuation of the holding members 5, being connected only by a central strip 24 of material. The intermediate part 6 for positioning by abutment comprises a bottom wall 31, which extends in the same plane as the base plate 12, a longitudinal abutment wall 32 extending mainly along a vertical axis V and along a transverse axis T, and two transverse abutment walls 22 extending mainly along a vertical axis V and along a longitudinal axis L. The longitudinal abutment wall 32 is perpendicular to the holding members 5 while the transverse abutment walls 22 are parallel to the holding members 5.

As its name implies, the intermediate part 6 for positioning by abutment is a zone in which the lateral walls of the heat exchangers come to bear and are held by abutment. The transverse abutment walls 22 are disposed on either side of the longitudinal abutment wall 32. These transverse abutment walls 22 form an angle of 90 degrees with the longitudinal abutment wall 32 and therefore extend along a longitudinal axis L toward the holding members 5, The intermediate part 6 for positioning by abutment thus forms a zone for receiving a longitudinal end of the heat exchangers and more particularly collector chambers arranged at the end of the heat exchangers.

A material cutout 16 is situated between the zone of the base plate 12 comprising the holding members 5 and the intermediate part 6 for positioning by abutment. The material cutout 16 ensures a certain flexibility between the zone of the base plate 12 comprising the holding members 5 and the bottom wall 31 of the intermediate part 6 for positioning by abutment, thereby ensuring flexibility of the fixing device 4. This flexibility makes it possible to compensate for certain forces that can be exerted during the mounting of the fixing device 4 as a result of any production-related defects of the parts, thereby limiting the potential risk of the fixing device 4 breaking, in particular if two fixing devices 4 are disposed on either side of the heat exchangers. In order to maintain the one-piece appearance of the fixing device 4, only the central strip 24 of material remains in the region of this material cutout to act as a link between the base plate 12 common to the holding members and the bottom wall 31 of the intermediate part 6 for positioning by abutment.

The fixing flange 7 extends on the opposite side from the holding members 5 with respect the intermediate part 6 for positioning by abutment, being secured to the external surface of the intermediate part 6 for positioning by abutment. The fixing flange 7 is intended to be joined to the support frame of the heat exchange system. In the embodiment described here, the fixing flange 7 is situated in the longitudinal continuation of the central strip 24 of material, and is in the form of a rectangular part with a transverse dimension identical to the transverse dimension of the central strip 24 of material. The fixing flange 7 is perpendicular to the longitudinal abutment wall 32 of the intermediate part 6 for positioning by abutment and comprises a flange orifice 15 that passes through the fixing flange 7 along a transverse axis T. More details relating to the connection between the fixing flange 7 and the support frame of the heat exchange system by way of the flange orifice 15 will be given below.

FIG. 3 is a top view of the fixing device according to the invention, revealing in particular the receiving zones 30 for the heat exchangers, represented by the zones situated between the holding members 5 forming a pair 21, The elements of the holding members 5 that protrude from the walls of the holding members 5 so as to extend at least partially across the receiving zones 30 for the heat exchangers are shown here, namely the ramps 10 of the flexible tongues, and the claws 11 of the longitudinal end portions 8 of the holding members 5. This viewing angle also makes it possible to view the flexibility of the longitudinal end portions 8 of the holding members 5, which can bend by rotating about a vertical axis 18, symbolized here by a curved dashed-line arrow. All the longitudinal end portions 8 of the holding members 5 have this bending property in the example illustrated.

As was specified above, the stiffening zone 25 is situated between each pair 21 of holding members 5. This stiffening zone 25 maintains the distance between the adjacent holding members 5 of two separate pairs 21 and therefore the distance between each pair 21 of holding members 5. Since the position of the pairs 21 of holding members 5 is ensured, the position of two heat exchangers when they are fitted on either side of the stiffening zone 25 is reliable. The stiffening zone 25 has a transverse dimension calculated such that the resulting spacing between the two heat exchangers is optimal for the thermal function that they respectively realize.

From the point of view of FIG. 3, it is apparent that the transverse abutment walls 22 of the intermediate part 6 for positioning by abutment are offset transversely with respect to the walls of the holding members, such that these transverse abutment walls do not extend in the continuation of the main plane of extension of the holding members 5 disposed at the transverse border of the base plate 12. Specifically, the heat exchangers comprise collector chambers 19 (visible in FIG. 1) having a transverse dimension substantially greater than the transverse dimension of the body of the heat exchangers. The zone for receiving the collector chambers therefore needs to have a transverse dimension greater than the receiving zones for the heat exchangers. In the example illustrated, the internal face of the longitudinal abutment walls 22 is aligned on the plane in which the external face of the holding members 5 that are disposed at the transverse border of the base plate 12 is inscribed.

FIG. 4 illustrates the fitting of the heat exchangers 3 within the fixing device 4, FIG. 5 is a cross-sectional view at a viewing angle along a vertical axis V of the heat exchangers 3 inserted into the fixing device. Each heat exchanger 3 is inserted by translational movement along a vertical axis V, in a direction perpendicular to the plane of extension of the bottom wall 12. The heat exchanger is therefore made to meet the holding members 5 of the corresponding pair 21 before being disposed next to the base plate 12, via direct contact with the receiving zone 30. During insertion, a plurality of elements of the fixing device 4 interact with the heat exchanger 3. The beveled upper faces 13 of the holding members 5 and of the longitudinal end portions 8 help to guide the heat exchanger 3 in order that the latter is centered in their receiving zone 30. The heat exchanger is then in contact with the oblique walls of the ramps 10 of the flexible tongues 9 and of the claws 11 of the longitudinal end portions 8 of the holding members 5. As described above, the flexible tongues 9 and the longitudinal end portions 8 are configured so as to be able to deform elastically to allow the heat exchanger to pass through. In other words, under the effect of the contact force exerted by the lower portion of the heat exchangers 3 on the ramps 10 and the claws 11, the flexible tongues 9 and the longitudinal end portions 8 bend so as to take up a retracted position in which the passage is left free for the insertion of the heat exchanger. The flexible tongues 9 bend by rotating about a longitudinal axis 17 while the longitudinal end portions 8 of the holding members 5 bend by rotating about a vertical axis 18. The insertion of the heat exchanger 3 continues until there is direct contact between the heat exchanger 3 and the receiving zones 30 of the base plate 12 of the fixing device 4. The final positioning of the heat exchangers 3 can be seen in FIG. 5, Once the heat exchanger 3 has been inserted into its appropriate receiving zone, the flexible tongue(s) 9 return(s) to its/their initial position by elastic return, The ramp(s) 10 is/are then positioned above a tube or a plate of the heat exchanger, if appropriate by deforming the fins disposed directly above this tube or plate, so as to form a stop with respect to the disengagement of the heat exchanger. The ramps 10 of the flexible tongues 9 thus prevent any vertical movement in the opposite direction to the insertion. The longitudinal end portions 8 of the holding members 5 also return to their initial position by elastic return. The sharp ends of the claws 11 then hook on the fins of the heat exchangers 3. This hooking ensures that the heat exchangers 3 are held, be this in a longitudinal, vertical or transverse direction. Furthermore, the longitudinal walls of the holding members 5 themselves ensure that the heat exchangers 3 are held transversely by virtue of the pairs of holding members 5 gripping each of the heat exchangers 3. The engagement of the ramps 10 and claws 11 in the volume of the corresponding heat exchanger, with deformation of the fins where appropriate, can be seen in FIG. 5.

The collector chambers 19 for their part are positioned at the intermediate part 6 for positioning by abutment. They are thus held in a longitudinal direction by direct contact with the longitudinal abutment wall 32 of the intermediate part 6 for positioning by abutment. The transverse abutment walls 22 furthermore ensure that the heat exchangers 3 are held transversely. This holding by the intermediate part for positioning by abutment can also be seen in FIG. 5.

FIG. 6 is a depiction of the connection between the fixing flange 7 and the support frame 2. This is one example of a type of fixing, but a multiplicity of fixing means are conceivable, as long as, in accordance with the invention, it is possible to fix, in one operation, a fixing device 4 common to a plurality of heat exchangers 3.

As indicated in this exemplary embodiment, the fixing flange is pierced by an orifice passing through the fixing flange 7 in a transverse direction. In order to be able to be fixed, the fixing flange 7 cooperates with a relief 26 on the support frame 2. This relief 26 is likewise provided with an orifice. When the fixing flange 7 and the relief 26 cooperate with one another, their respective orifices face one another. Thus, a fixing means 20, in this case a screw for example, the shank of which passes through the orifices and fixes the fixing flange 7 and the relief 26 together, can be used. Since the fixing device 4 already holds the heat exchangers 3 by way of all of the above-described elements, it is then also connected to the support frame 2, thereby fixing the whole of the heat exchange system within the radiator grille of the vehicle.

FIG. 6 also reveals the small overlap of the heat exchangers 3 by the holding members 5. In addition to ensuring all of the fixings by being in one piece, the fixing device 4 also greatly limits the mechanical bulk brought about by its presence, on account of its relatively small dimensions compared with the corresponding dimensions of the heat exchange system.

The invention is not limited to the means and configurations described and illustrated herein, however, and also extends to all equivalent means or configurations and to any technically operational combination of such means. The embodiments that are described above are entirely nonlimiting; it will be possible, in particular, to imagine variants of the invention that comprise only a selection of the features described below, in isolation from the other features described in this document, as long as this selection of features is sufficient to confer a technical advantage or to distinguish the invention from the prior art.

The invention claimed is:

1. A device for fixing at least two heat exchangers that are stacked with respect to one another and are integrated in a heat exchange system of a vehicle, the fixing device comprising:
    pairs of holding members, wherein each of the pairs of holding members is configured for holding one of the heat exchangers; and
    a flange for fixing to a support frame of the heat exchange system,
    each of the holding members being arranged so as to protrude from a base plate,
    wherein each of the holding members is a wall perpendicular to the base plate, extending in a vertical direction and a longitudinal direction,
    each of the pairs of holding members being configured to grip a lower end of a heat exchanger and hold the heat exchanger in a transverse direction,
    wherein the longitudinal and vertical directions are defined along axes parallel to straight lines defining a plane of extension of the heat exchanger, the longitudinal direction being parallel to the base plate and the vertical direction being perpendicular to the base plate, the transverse direction being perpendicular to the longitudinal and vertical directions;
    wherein the fixing device is a one-piece assembly, such that the holding members and the base plate are inseparable from one another without breaking the fixing device;
    wherein each holding member of the pairs of holding members comprises a plurality of flexible tongues, and
    wherein each flexible tongue of the plurality of flexible tongues is configured to retract by rotating about a longitudinal axis, thereby opening a receiving zone for receiving one heat exchanger of the at least two heat exchangers, and is further configured to vertically hold the heat exchanger by elastic return across the receiving zone.

2. The fixing device as claimed in claim 1, wherein the pairs of holding members are spaced apart from one another by a stiffening zone.

3. The fixing device as claimed in claim 1, wherein the pairs of holding members comprise two pairs of holding members that are separated by a stiffening zone, the fixing flange being arranged in a centered position in continuation of the stiffening zone.

4. The fixing device as claimed in claim 1, wherein longitudinal end portions of each of the holding members are not directly in contact with the base plate, bend via rotating about a vertical axis, and comprise claws that hook on the heat exchangers.

5. The fixing device as claimed in claim 1, further comprising an intermediate part for positioning by abutment between each of the holding members for the heat exchangers and the flange for fixing to a support frame of the heat exchange system.

6. The fixing device as claimed in claim 5, wherein the base plate comprises a material cutout between said each of the holding members and the intermediate part for positioning by abutment.

7. A heat exchange system comprising:
    at least two heat exchangers; and
    a fixing device as claimed in claim 1, wherein the fixing device is arranged next to a vertical end edge of the heat exchangers, and a support frame to which the fixing device is fixed.

8. The heat exchange system as claimed in claim 7, wherein the heat exchangers are held mechanically by a second fixing device situated at an opposite longitudinal end from the longitudinal end comprising a first fixing device.

* * * * *